(12) United States Patent
Krüger et al.

(10) Patent No.: US 8,360,192 B2
(45) Date of Patent: Jan. 29, 2013

(54) EXHAUST SYSTEM WITH ACTIVE EXHAUST MUFFLER

(75) Inventors: Jan Krüger, Neuhausen (DE); Manfred Nicolai, Esslingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 187 days.

(21) Appl. No.: 12/824,444

(22) Filed: Jun. 28, 2010

(65) Prior Publication Data

US 2011/0000734 A1 Jan. 6, 2011

(30) Foreign Application Priority Data

Jul. 3, 2009 (DE) .......................... 10 2009 031 848

(51) Int. Cl.
*B60K 13/04* (2006.01)
(52) U.S. Cl. ........................ 180/309; 180/444
(58) Field of Classification Search .................. 180/309, 180/444; 381/71.4, 71.7; 181/250, 254, 181/206, 272
See application file for complete search history.

(56) References Cited

U.S. PATENT DOCUMENTS

| | | | | |
|---|---|---|---|---|
| 5,343,533 A | * | 8/1994 | Geddes | 381/71.7 |
| 5,600,106 A | * | 2/1997 | Langley | 181/206 |
| 5,619,020 A | * | 4/1997 | Jones et al. | 181/206 |
| 5,693,918 A | * | 12/1997 | Bremigan et al. | 181/206 |
| 5,748,749 A | * | 5/1998 | Miller et al. | 381/71.7 |
| 6,005,957 A | * | 12/1999 | Meeks | 181/171 |
| 6,072,880 A | * | 6/2000 | Shipps et al. | 181/206 |
| 6,963,647 B1 | | 11/2005 | Krueger et al. | |
| 7,006,639 B2 | * | 2/2006 | Hobelsberger | 381/96 |
| 7,293,626 B2 | * | 11/2007 | Ozsoylu et al. | 180/444 |
| 7,293,627 B2 | * | 11/2007 | Kruger et al. | 181/206 |
| 7,533,759 B2 | | 5/2009 | Krueger et al. | |
| 7,891,463 B2 | * | 2/2011 | Kruger et al. | 181/206 |
| 2002/0071571 A1 | * | 6/2002 | Vanderveen et al. | 381/71.4 |
| 2006/0054381 A1 | | 3/2006 | Takemoto et al. | |
| 2007/0045043 A1 | * | 3/2007 | Hoerr et al. | 181/250 |
| 2008/0053747 A1 | | 3/2008 | Krueger et al. | |

FOREIGN PATENT DOCUMENTS

| | | |
|---|---|---|
| DE | 43 17 403 A1 | 12/1994 |
| DE | 102006042224 B3 | 1/2008 |
| EP | 0 674 097 A1 | 9/1995 |
| JP | 05098927 A | 4/1993 |
| JP | 2005282523 A | 10/2005 |

* cited by examiner

*Primary Examiner* — Hau Phan
(74) *Attorney, Agent, or Firm* — McGlew and Tuttle, P.C.

(57) ABSTRACT

An exhaust system (3) for an internal combustion engine (2), especially of a motor vehicle (1), is provided with at least one exhaust pipe (10), which carries an exhaust gas flow (11) away from the internal combustion engine (2) during the operation of the internal combustion engine (2). An active exhaust muffler (12) is provided with a housing (13) that is acoustically connected to the exhaust pipe (10) via a connection pipe (15). Damage to the exhaust muffler (12) is avoided by actively and/or passively cooling the connection pipe (15).

21 Claims, 3 Drawing Sheets

EXHAUST SYSTEM WITH ACTIVE EXHAUST MUFFLER

CROSS REFERENCE TO RELATED APPLICATIONS

This application claims the benefit of priority under 35 U.S.C. §119 of German Patent Application DE 10 2009 031 848.8 filed Jul. 3, 2009, the entire contents of which are incorporated herein by reference.

FIELD OF THE INVENTION

The present invention pertains to an exhaust system for an internal combustion engine, especially of a motor vehicle. The present invention pertains, in addition, to a vehicle, especially a passenger car, with an internal combustion engine and with such an exhaust system.

BACKGROUND OF THE INVENTION

An exhaust system usually comprises an exhaust pipe, which carries an exhaust flow away from the internal combustion engine during the operation of the internal combustion engine. Exhaust gas-treating means, for example, particle filters, exhaust mufflers and catalytic converters, may be integrated in this exhaust pipe. Passive exhaust mufflers, which operate, e.g., by means of resonance, absorption, interference and reflection to muffle the air-borne sound being transported in the exhaust pipe, are predominantly used in exhaust mufflers. Contrary hereto, active exhaust mufflers operate with at least one loudspeaker in order to deliberately generate opposing sound. More or less effective extinction of the sound to be muffled is brought about thereby.

Many motor vehicles, especially passenger cars, have a front engine, i.e., an internal combustion engine that is housed in a front-side engine compartment of the vehicle. To make it possible to comply with the noise protection regulations specified for passenger cars, an exhaust system, which operates with passive exhaust mufflers, requires a comparatively great acoustic length. Conventional exhaust systems correspondingly extend from the internal combustion engine arranged on the front side to the rear of the vehicle, where a tail pipe of the exhaust system is located. Exhaust systems for vehicles with front engine, in which the tail pipe is arranged on the side between a front axle and a rear axle of the vehicle, so-called "side pipes,"operate with large-volume exhaust mufflers in order to embody the aforementioned, great acoustic length within the exhaust muffler, e.g., by multiple deflections. Exhaust systems of vehicles with rear engines likewise operate with relatively large-volume exhaust mufflers.

To reduce the energy consumption and pollutant emissions in motor vehicles, it is desirable to make the vehicle more lightweight. Correspondingly, there also are considerations to use active exhaust mufflers, which have a markedly reduced volume as well as markedly reduced weight, instead of the large-volume passive exhaust mufflers. However, the circumstance that the loudspeakers used in the active exhaust mufflers have a comparatively low heat resistance only, which is always below the usual exhaust gas temperatures, is problematic. In principle, active exhaust mufflers in vehicles with front engines can be connected to the exhaust system in the rear area, i.e., quasi as rear mufflers, because the exhaust gases will usually have already cooled sufficiently until the end of such long exhaust systems. A shortening of the exhaust system, which is carried out in order to reduce weight, would have the consequence that the active exhaust muffler would be positioned relatively close to the internal combustion engine. However, the exhaust gases are especially hot close to the engine, which increases the risk of damage to the active exhaust muffler.

SUMMARY OF THE INVENTION

The object of the present invention is to propose an improved embodiment for an exhaust system or for a motor vehicle equipped therewith, which is characterized especially in that the risk of thermal damage to the active exhaust muffler is reduced. This shall make it possible, in particular, to position the active exhaust muffler close to the engine. In addition, it shall be possible to manufacture an especially lightweight exhaust system.

The present invention is based on the general idea of using a connection pipe, via which the active exhaust muffler is connected acoustically to the exhaust pipe carrying the exhaust gas. Furthermore, this connection pipe shall be cooled. The use of such a connection pipe prevents direct admission of the exhaust gas flow being carried in the exhaust pipe to the active exhaust muffler, as a result of which the thermal load of the exhaust muffler is significantly reduced as well. The exhaust gas is moving in this connection pipe essentially only on account of the pressure pulsations of the sound being transported in the exhaust gas. In addition, swirling, which generates a motion of the exhaust gas, which is slight but is not directed towards the exhaust muffler, may be generated in a connection area, in which the connection pipe is connected to the exhaust pipe. The gas volume "stagnant" in the connection pipe acts like a heat insulation. The cooling of the connection pipe, which may take place actively or passively or both actively and passively, leads to a further significant reduction of the heat transfer from the exhaust pipe to the exhaust muffler. Due to the cooling of the connection pipe, the connection pipe acts as a heat sink, which effectively prevents or at least markedly reduces the heat transfer from the exhaust pipe to the exhaust muffler via the connection pipe. The measures proposed thus reduce the thermal load of the active exhaust muffler or of the heat-sensitive components arranged therein, e.g., the loudspeaker and the loudspeaker drive as well as optionally the loudspeaker control. It is possible as a result, in particular, to connect the active exhaust muffler to the exhaust pipe via the cooled collection pipe at a comparatively short distance from the internal combustion engine. In addition, this makes it possible to significantly shorten the exhaust system downstream of the active exhaust muffler, as a result of which an appreciable weight reduction can be achieved.

Corresponding to an advantageous embodiment, the connection pipe may have cooling fins on its outside. Such cooling fins enlarge the surface of the connection pipe available for heat radiation, which improves the cooling of the connection pipe based on the temperature difference from the environment. In addition or as an alternative, the connection pipe may have cooling fins and/or turbulators on its inside. The heat transfer from the exhaust gas, which is located inside the connection pipe, to the connection pipe is improved thereby, as a result of which the heat-insulating action of the exhaust gas volume enclosed by the connection pipe is improved. It is, furthermore, possible, in principle, to manufacture the connection pipe from a material that has an especially high thermal conductivity, e.g., aluminum or copper or corresponding Al or Cu alloys.

The connection pipe can be advantageously arranged at or in the vehicle such that it is exposed to an air flow during the operation of the vehicle. The release of heat on the outside of the connection pipe to the environment or to the air flow is improved by such an air flow. The cooling action of the connection pipe is likewise improved thereby. Such an air flow may develop, for example, due to the travel of the vehicle, the so-called relative wind. For example, the connection pipe may be arranged for this purpose at a site exposed to the relative wind, e.g., in the area of an underbody of the vehicle. It is also possible by means of corresponding flow guide means to guide the relative wind to the connection pipe in order to generate the desired air flow that is to reach the connection pipe. In addition or as an alternative to these passive measures for cooling the connection pipe, it is also possible to generate such an air flow to reach the connection pipe by means of a blower. Blowers are used in vehicles, especially in air-liquid heat exchangers, so-called coolers. To cool the connection pipe, it is now possible to deflect an air flow generated by means of such a blower, which is present anyway, at least partly or to position the connection pipe such that the connection pipe will be exposed to the air flow as desired. It is also possible, as an alternative, to provide a separate blower to generate the cooling air flow for the connection pipe.

Corresponding to another advantageous embodiment, the connection pipe may be coupled with a cooling circuit, in which a coolant circulates. Liquid coolants are preferably used, as a result of which intensive heat transfer can be achieved.

To intensify the heat-transferring coupling between the connection pipe and the cooling circuit, the connection pipe may be designed as a heat exchanger, which couples a gas path with a liquid path in such a way that the media are separated and heat is transferred, and whose gas path acoustically connects the housing of the exhaust muffler with the exhaust pipe and whose liquid path is integrated in the cooling circuit.

The cooling intended for the connection pipe can advantageously also be used additionally, e.g., by means of an air flow and/or cooling circuit, to cool a housing of the exhaust muffler, as a result of which the protection of the components arranged therein against overheating is improved.

Other important features and advantages of the present invention appear from the subclaims, from the drawings and from the corresponding description of the figures on the basis of the drawings.

It is obvious that the above-mentioned features, which will also be explained below, can be used not only in the particular combination indicated, but in other combinations or alone as well, without going beyond the scope of the present invention.

Preferred embodiments of the present invention are shown in the drawings and will be explained in more detail in the following description, where identical reference numbers designate identical or similar or functional identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
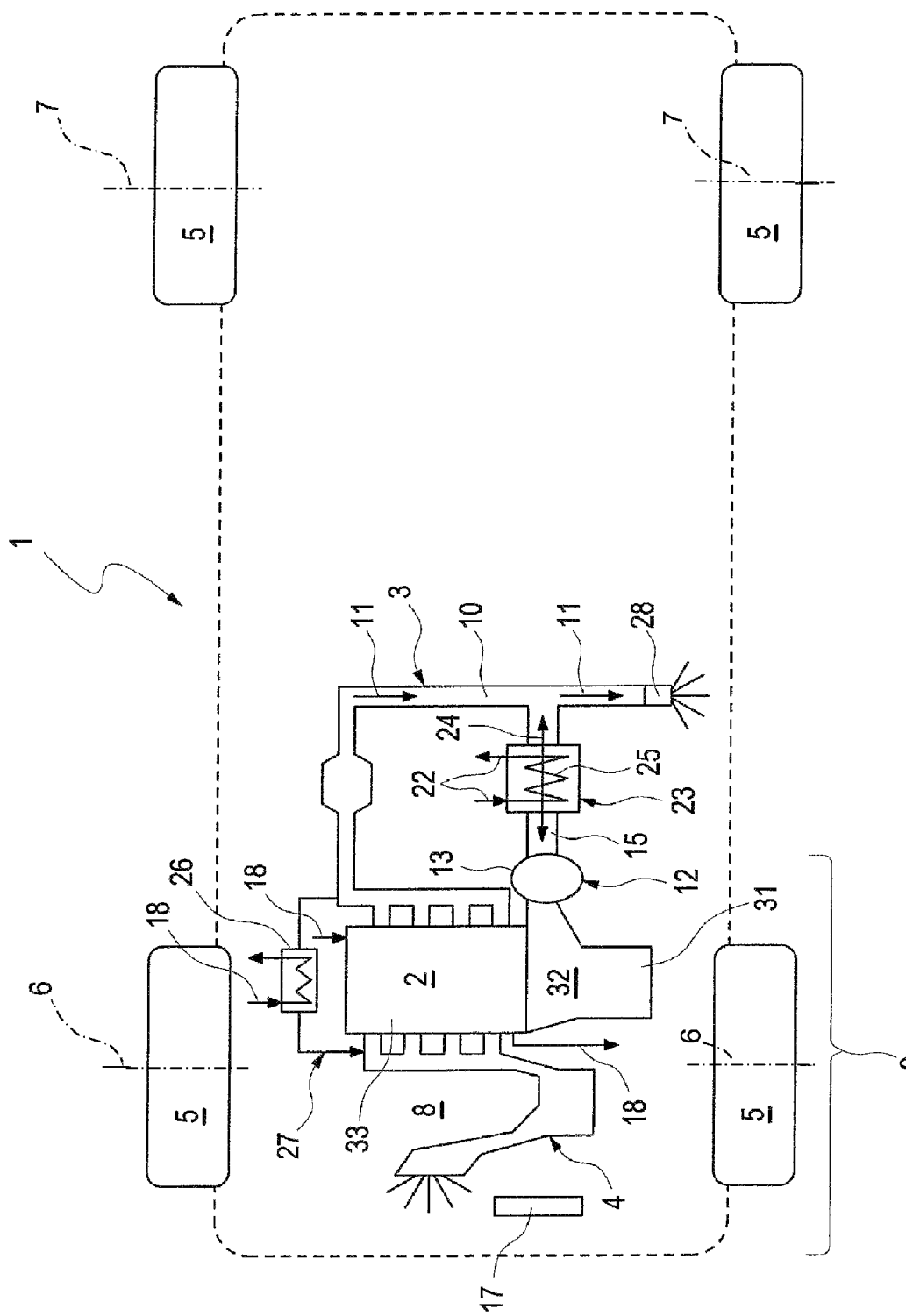
FIG. 1 is a simplified schematic circuit diagram-like general view of a motor vehicle according to the invention.

Referring to the drawings in particular, corresponding to FIG. 1, a motor vehicle 1, which is preferably a passenger car, comprises an internal combustion engine 2 as well as an exhaust system 3 for removing exhaust gases from the internal combustion engine 2, which are generated by the internal combustion engine 2 during the operation thereof. Furthermore, a fresh air system 4 for supplying the internal combustion engine 2 with fresh air as well as vehicle wheels are indicated. A first dash-dotted line indicates a front axle 6, about which the front wheels 5 of the vehicle 1, which are shown on the left in FIG. 1, rotate. A second dash-dotted line indicates a rear axle 7, about which the rear wheels 5 of the vehicle 1, which are shown on the right in FIG. 1, rotate. The internal combustion engine 2 is arranged at a vehicle 1 in an engine compartment 8, which is arranged in the vehicle 1 on the front side, i.e., in a front area 9 of vehicle 1. The vehicle 1 is consequently equipped with a front engine.

Figure 2:
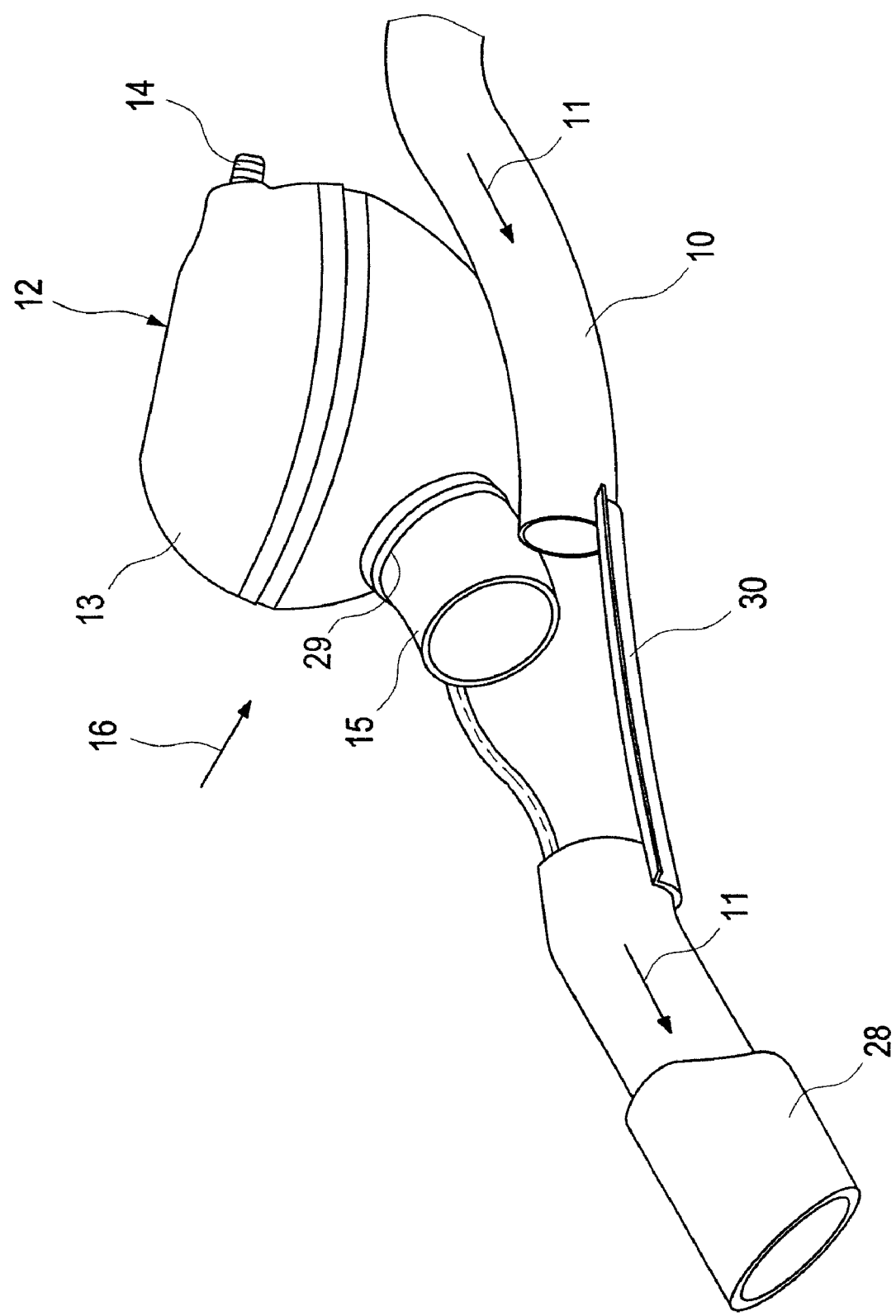
FIG. 2 is a schematic perspective view of an exhaust system in the area of an active exhaust muffler.
Figure 3:
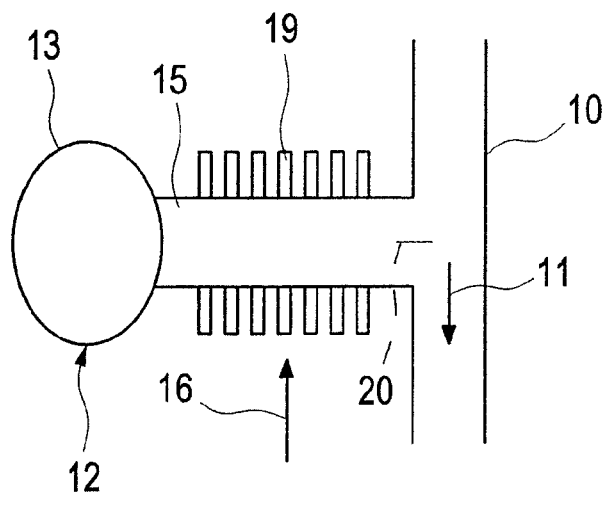
FIG. 3 is a simplified schematic general view of the exhaust system in the area of the exhaust system exhaust muffler.

The exhaust system 3 has, corresponding to FIGS. 1 through 3, at least one exhaust pipe 10. This carries an exhaust gas flow 11 indicated by arrows away from the internal combustion engine 2 during the operation of the internal combustion engine 2. Furthermore, the exhaust system 3 is equipped with at least one active exhaust muffler 12. This contains, in a housing 13, active components, which are not shown here and are to be protected from overheating. These components are, for example, a loudspeaker, a loudspeaker driver or loudspeaker drive as well as optionally a control or control circuit and/or power circuit. An electric terminal for the electric components of the exhaust muffler 12 is designated by 14 in FIG. 2. Housing 13 of the exhaust muffler 12 is connected to the exhaust pipe 10 via a connection pipe 15 such that an acoustic coupling develops for airborne sound. In other words, airborne sound being transported in the exhaust pipe can reach the exhaust muffler 12 through the connection pipe 15. Opposing sound generated by the active components of the exhaust muffler 12 can likewise reach the exhaust pipe 10 or enter the exhaust pipe 10 through the connection pipe 15.

To reduce the thermal load of the exhaust muffler 12 or the active and/or electric components thereof, the connection pipe 15 is a actively and/or passively cooled connection pipe 15. The cooling is provided by an active and/or passive cooling means. Both active and passive cooling may be considered here for the cooling means to provide the cooled connection pipe 15. Active and passive cooling measures may be used cumulatively or alternatively.

Figure 4:
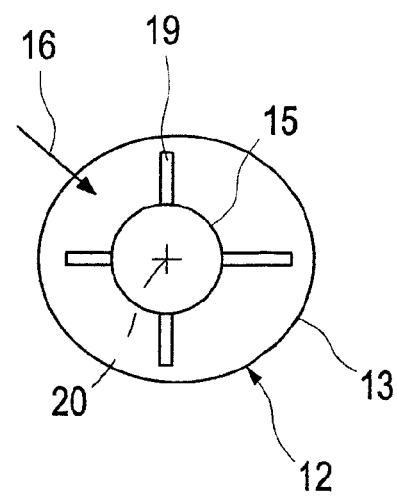
FIG. 4 is a schematic cross sectional view through a connection pipe in case of a special embodiment according to the invention.

For example, the cooling means may be provided by an arrangement of the connection pipe 15 at the vehicle 1 or in the vehicle 1 such that the connection pipe 15 is exposed to an air flow 16 indicated by an arrow in FIGS. 3 and 4 to form a cooled connection pipe 15. This air flow 16 may be generated by the travel of the vehicle 1, a so-called relative wind. A blower 17, which is shown in a simplified form in FIG. 1, may also be provided to generate this air flow 16. Such a blower may be present anyway in the vehicle 1, especially in the engine compartment 8 thereof, for example, in order to admit air flow to be cooled to the main cooler of an engine cooling circuit 18, which said main cooler is not shown here. The engine cooling circuit 18, which is shown here in a simplified form only, is used in the usual manner to cool the internal combustion engine 2. Another blower 17, which is present in vehicle 1 anyway, may also be used to generate the air flow 16 in order to cool the connection pipe 15. Furthermore, it is conceivable to arrange in vehicle 1 a separate blower 17 for the connection pipe 15, which is provided exclusively to generate the air flow 16 to be sent to the connection pipe 15. Thus, connection pipe 15 has a blower 17 of its own.

Especially advantageous is a variant in which housing 13 of the exhaust muffler 12 is also arranged in or at the vehicle 1 such that the housing 13 is also exposed to the air flow 16, so that the connection pipe 15 and the housing 13 are jointly exposed to the cooling air flow.

Corresponding to FIGS. 3 and 4, the cooling means may comprise the connection pipe 15 being provided with cooling fins 19 on its outside to provide the cooled connection pipe 15. These cooling fins 19 may extend in the circumferential direction in respect to a longitudinal axis 20 of the connection pipe 15 corresponding to FIG. 3. The cooling fins 19 are ring-shaped. It is also conceivable according to FIG. 4 to orient the cooling fins 19 in parallel to the longitudinal axis 20 of the connection pipe 15. They then form longitudinal fins projecting in a web-like manner.

Figure 5:
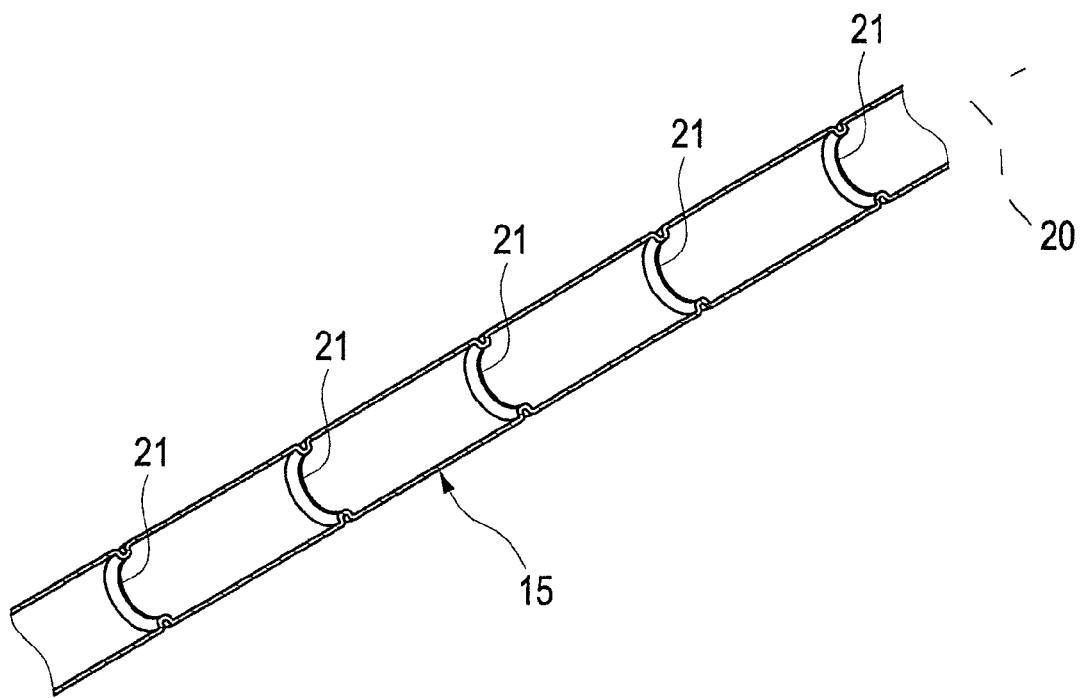
FIG. 5 is a schematic perspective view of a connection pipe in the longitudinal section in case of another embodiment according to the invention.

In addition or as alternative, it is possible according to FIG. 5, in addition or as an alternative to the cooling fins 19 arranged on the outside of the connection pipe 15, for the cooling means to comprise the connection pipe 15 with cooling fins 21 on an inside of the cooling pipe 15. A plurality of cooling fins 21 extending circumferentially in an annular pattern in relation to the longitudinal axis 20 are indicated in the example. These may be prepared, for example, by beading, the beads being prepared on the outside of the connection pipe 15. In addition or as an alternative, turbulators, which can likewise bring about an improvement of the heat transfer from the gas volume in the interior of the connection pipe 15 and the exterior of the connection pipe 15, may also be arranged on the inside of the connection pipe 15.

To make it possible to utilize the air flow generated during travel specifically to reach the connection pipe 15, the cooling means may be an arrangement with the vehicle 1 having corresponding air guide elements, especially in the engine compartment 8. This also applies to a specific flow guiding for the case in which a blower 17 is used to generate the air flow 16.

Corresponding to FIG. 1, provisions may be made in an especially advantageous embodiment for coupling the connection pipe 15 with a cooling circuit 22 in a heat-transferring manner. A coolant, which is especially a liquid coolant, circulates in this cooling circuit 22 to form the cooling means and to provide the cooled connection pipe 15. Corresponding to the preferred example shown in FIG. 1, connection pipe 15 may be designed at least partly as a heat exchanger 23, which has a gas path indicated by a double arrow and a liquid path 25 and couples them with one another in such a way that the media are separated from each other and heat is transferred. Gas path 24 connects the housing 13 with the exhaust pipe 10 such that the desired acoustic coupling takes place via this gas path 24. The liquid path 25 of this heat transfer unit or heat exchanger 23 is integrated into the cooling circuit 22. Intense cooling of the connection pipe 15 can be achieved thereby. Furthermore, thermal uncoupling of the exhaust muffler 12 from the exhaust pipe 10 is quasi achieved thereby.

Cooling circuit 22, which is used to cool the connection pipe 15, may be a cooling circuit 22 designed as a separate cooling circuit for the connection pipe 15 in vehicle 1. The necessary cooling capacity can be optimally guaranteed thereby. However, this cooling circuit 22 is preferably a branch or section of a cooling circuit already present in vehicle 1 anyway. For example, cooling circuit 22 may be a branch or section of the engine cooling circuit 18. The internal combustion engine 2 is integrated in this engine cooling circuit 18 in the example. In another embodiment, an exhaust gas recirculation cooler 26 of an exhaust gas recirculation system 27 may be integrated in the engine cooling circuit 18, which is coupled with cooling circuit 22 to cool the connection pipe 15. An intercooler, not shown here, which cools the fresh air charged in case of the use of a charging means, may also be integrated in the engine cooling circuit 18. It is also possible that the internal combustion engine 2 and/or the exhaust gas recirculation cooler 26 and/or the intercooler and/or at least one other vehicle-mounted cooler is/are integrated in the engine cooling circuit 18, which is coupled with the cooling circuit 22 intended for cooling the connection pipe 15.

An embodiment in which housing 13 of the exhaust muffler 12 is also coupled with the cooling circuit 22, which is intended for cooling the connection pipe 15, in a heat-transferring manner, is especially advantageous here as well. For example, housing 13 may have a double-walled jacket, which is integrated into the respective cooling circuit 22, as a result of which housing 13 can be swept by the corresponding coolant or the corresponding coolant can flow through it.

Corresponding to FIG. 1, the exhaust muffler 12 is preferably arranged together with the connection pipe 15 in the engine compartment 8 of vehicle 1. The active exhaust muffler 12 has an extremely compact design, as a result of which it is possible to house it in the engine compartment 8, i.e., close to the internal combustion engine 2. In addition, it is possible as a result of this to extremely shorten the exhaust system 3. For example, a tail pipe 28 of the exhaust system 3, through which the exhaust gas flow 11 is discharged into the environment of the vehicle 1, may be arranged between the front axle 6 and the rear axle 7, namely, preferably on an underbody of vehicle 1, which the underbody is not shown here. Furthermore, it is possible, in particular, to arrange the tail pipe 28 in the engine compartment 8, as a result of which the exhaust system 3 becomes even shorter.

Corresponding to FIG. 2, housing 13 has a sound outlet opening 29, through which the opposing sound generated by the loudspeaker leaves housing 13. Connection pipe 15 is connected to this sound outlet opening 29 in order to achieve the desired acoustic coupling between the exhaust muffler 12 and the exhaust pipe 10. Connection pipe 15 is connected to the exhaust pipe 10 via a connection or junction piece 30 in the example shown in FIG. 2. This connection piece 30 may be designed, for example, as a T-piece. Connection piece 30 is designed as a Y-piece in the example according to FIG. 2. Exhaust muffler 12 may be designed especially advantageously as a preassembled unit together with connection pipe 15. The assembly of the exhaust system 3 is simplified thereby.

According to FIG. 1, exhaust muffler 12 may be connected, especially via its housing 13, to a transmission block 31 of a transmission 32, which transmission is attached to the internal combustion engine 2. The exhaust muffler 12 may also be attached to an engine block 33 of the internal combustion engine 2.

While specific embodiments of the invention have been described in detail to illustrate the application of the principles of the invention, it will be understood that the invention may be embodied otherwise without departing from such principles.

What is claimed is:

1. An exhaust system for an internal combustion engine, the exhaust system comprising:
    at least one exhaust pipe carrying an exhaust gas flow away from the internal combustion engine during the operation of the internal combustion engine;
    a connection pipe;
    at least one active exhaust muffler comprising an exhaust muffler housing acoustically connected to the exhaust pipe via the connection pipe, the connection pipe providing a fluid connection through the connection pipe from the exhaust gas flow in the exhaust pipe to an interior of the exhaust muffler housing; and
    a cooling means for at least one of actively and passively cooling the connection pipe.

2. An exhaust system in accordance with claim 1, wherein the cooling means comprises cooling fins on an outside of the connection pipe.

3. An exhaust system in accordance with claim 1, wherein the cooling means comprises an arrangement of the connection pipe in or at a vehicle to expose the connection pipe to an air flow, the airflow being generated by the travel of the vehicle or by a blower present at the vehicle.

4. An exhaust system in accordance with claim 3, wherein the blower present at the vehicle is a separate blower from a vehicle engine blower, the separate blower generating an air flow and sending the air flow to the connection pipe, the separate blower being associated with the connection pipe.

5. An exhaust system in accordance with claim 4, wherein the separate blower of the exhaust muffler is arranged in or at the vehicle such that the blower is likewise exposed to the air flow provided to be sent to the connection pipe.

6. An exhaust system in accordance with claim 1, wherein the cooling means comprises a cooling circuit and the connection pipe is coupled with the cooling circuit and coolant circulates in the cooling circuit in a heat-transferring manner.

7. An exhaust system in accordance with claim 6, wherein the cooling means comprises the connection pipe comprising a heat exchanger or a the connection pipe integrated in the heat exchanger, the heat exchanger coupling a gas path with a liquid path in a heat-transferring manner and the gas path acoustically connects the exhaust muffler housing with the exhaust pipe and the liquid path is integrated into the cooling circuit.

8. An exhaust system in accordance with claim 6, wherein the cooling circuit is coupled with the connection pipe with a branch or section of an engine cooling circuit into which at least one of an internal combustion engine and an exhaust gas recirculation cooler and an intercooler is integrated.

9. An exhaust system in accordance with claim 6, wherein the exhaust muffler housing is coupled with the cooling circuit for cooling the connection pipe in a heat-transferring manner.

10. An exhaust system in accordance with claim 1, wherein the cooling means comprises at least one of cooling fins and turbulators on an inside of the connection pipe.

11. An exhaust system in accordance with claim 1, wherein the exhaust muffler and connection pipe are arranged in an engine compartment of a vehicle, in which the internal combustion engine is arranged as well.

12. An exhaust system in accordance with claim 11, further comprising a tail pipe through which the exhaust gas is discharged into the environment of the vehicle, the tail pipe being arranged in the installed state of the exhaust system in the engine compartment, in which the internal combustion engine is arranged as well.

13. An exhaust system in accordance with claim 11, wherein the engine compartment is arranged in a front area of the vehicle.

14. An exhaust system in accordance with claim 1, further comprising a tail pipe through which the exhaust gas is discharged into the environment of the vehicle, the tail pipe being arranged in the installed state of the exhaust system between a front axle and a rear axle of the vehicle on an underbody of vehicle.

15. A vehicle comprising:
    an internal combustion engine;
    an exhaust system comprising:
        at least one exhaust pipe carrying an exhaust gas flow away from the internal combustion engine during the operation of the internal combustion engine;
        a connection pipe arrangement comprising a connection pipe and a connection pipe cooling means for cooling the connection pipe; and
        at least one active exhaust muffler comprising an exhaust muffler housing acoustically connected to the exhaust pipe via the connection pipe, the connection pipe providing a fluid connection from the exhaust gas flow within the exhaust pipe to, through the connection pipe and into an interior of the exhaust muffler housing.

16. An exhaust system in accordance with claim 15, wherein:
    the connection pipe cooling means comprises at least one of a vehicle air flow generated by the travel of the vehicle and a blower generating a blower air flow; and
    the connection pipe arrangement positions the connection pipe relative to the connection pipe cooling means.

17. A vehicle in accordance with claim 15, wherein the connection pipe cooling means comprises at least one of:
    cooling fins on an inside of the connection pipe;
    turbulators an inside of the connection pipe; and
    cooling fins on an outside of the connection pipe.

18. A vehicle in accordance with claim 15, wherein the connection pipe cooling means comprises a cooling circuit and the connection pipe is coupled with the cooling circuit and coolant circulates in the cooling circuit in a heat-transferring manner.

19. A vehicle in accordance with claim 15, further comprising:
    an engine compartment with the internal combustion engine arranged therein, the exhaust muffler and the connection pipe also being arranged in the engine compartment.

20. A vehicle comprising:
    an internal combustion engine;
    an exhaust system comprising:
        at least one exhaust pipe carrying an exhaust gas flow away from the internal combustion engine during the operation of the internal combustion engine;
        a cooled connection pipe; and
        at least one active exhaust muffler comprising an exhaust muffler housing acoustically connected to the exhaust pipe via the connection pipe, wherein the cooled connection pipe comprises a connection pipe and a heat exchanger coupling a gas path with a liquid path in a heat-transferring manner, the liquid path being connected to a vehicle cooling circuit, the gas path acoustically connecting the exhaust muffler housing with the exhaust pipe and the liquid path.

21. An exhaust system for an internal combustion engine, the exhaust system comprising:
- at least one exhaust pipe carrying an exhaust gas flow away from the internal combustion engine during the operation of the internal combustion engine;
- a connection pipe;
- at least one active exhaust muffler comprising an exhaust muffler housing acoustically connected to the exhaust pipe via the connection pipe; and
- a cooling means for cooling the connection pipe, wherein the cooling means comprises a cooling circuit and the connection pipe is coupled with the cooling circuit and coolant circulates in the cooling circuit in a heat-transferring manner.

* * * * *